(12) United States Patent
Gartelmann

(10) Patent No.: US 10,994,830 B2
(45) Date of Patent: May 4, 2021

(54) FLAP ACTUATING SYSTEM FOR USE IN AN AIRCRAFT

(71) Applicant: Airbus Operations GmbH, Hamburg (DE)

(72) Inventor: Rainer Gartelmann, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 291 days.

(21) Appl. No.: 16/159,901

(22) Filed: Oct. 15, 2018

(65) Prior Publication Data

US 2019/0127048 A1 May 2, 2019

(30) Foreign Application Priority Data

Oct. 30, 2017 (DE) ...................... 10 2017 125 382.3

(51) Int. Cl.
| | |
|---|---|
| *B64C 13/28* | (2006.01) |
| *B64C 9/14* | (2006.01) |
| *B64C 9/02* | (2006.01) |
| *B64C 13/34* | (2006.01) |
| *B64C 3/50* | (2006.01) |

(52) U.S. Cl.
CPC ............... *B64C 13/28* (2013.01); *B64C 3/50* (2013.01); *B64C 9/02* (2013.01); *B64C 9/14* (2013.01); *B64C 13/34* (2013.01)

(58) Field of Classification Search
CPC ........... B64C 13/28; B64C 13/34; B64C 3/50; B64C 9/02
See application file for complete search history.

(56) References Cited

U.S. PATENT DOCUMENTS

| 4,381,093 A | * | 4/1983 | Rudolph | B64C 9/16 244/216 |
|---|---|---|---|---|
| 4,995,575 A | * | 2/1991 | Stephenson | B64C 9/16 244/216 |
| 5,128,688 A | * | 7/1992 | West | H01Q 1/34 114/340 |
| 2007/0108343 A1 | * | 5/2007 | Wingett | B64C 13/341 244/99.3 |
| 2008/0169383 A1 | * | 7/2008 | Patzelt | B64C 9/02 244/216 |
| 2013/0075537 A1 | * | 3/2013 | Sakurai | B64C 9/16 244/216 |
| 2013/0146716 A1 | * | 6/2013 | Gettinger | B64C 5/12 244/215 |
| 2015/0114151 A1 | * | 4/2015 | Hirai | F15B 9/12 74/89.25 |

(Continued)

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A flap actuating system for use in an aircraft comprises a carriage for supporting and guiding a flap which is engageable with and translationally movable along at least one linear bearing rail. A linear actuator of the flap actuating system has a linearly actuatable coupling element coupled to the carriage and a drive element configured to linearly actuate the coupling element in a direction substantially parallel to a movement direction of the carriage along the linear bearing rail. The drive element is arranged substantially parallel to the movement direction of the carriage along the linear bearing rail.

18 Claims, 5 Drawing Sheets

(56) References Cited

U.S. PATENT DOCUMENTS

2019/0055005 A1* 2/2019 Young .................... B64C 13/28
2019/0092454 A1* 3/2019 Mortland ................. B64C 9/16
2019/0367156 A1* 12/2019 Dickey .................... F16B 1/02

* cited by examiner

FLAP ACTUATING SYSTEM FOR USE IN AN AIRCRAFT

CROSS-REFERENCES TO RELATED APPLICATIONS

This application claims the benefit of the German patent application No. 10 2017 125 382.3 filed on Oct. 30, 2017, the entire disclosures of which are incorporated herein by way of reference.

BACKGROUND OF THE INVENTION

The present invention refers to a flap actuating system for use in an aircraft.

Aircraft airfoils are designed such that their geometry of the airfoil profile is adjustable or adaptable to the varying boundary conditions prevailing in different states of the course of a flight, such as during landing, take-off or cruise. Flap arrangements are known for selectively actuating a flap connected to an airfoil main body to extend into or retract from an air flow boundary layer of the airfoil so as to selectively vary the aerodynamic lift generated by the airfoil. Such conventionally known flap arrangements have a complex construction requiring a complex support and actuating mechanism for selectively extending and retracting the flap arrangement. For reducing the complexity of such flap arrangements, it is known to provide linear rolling-element bearings in the airfoil main body for supporting and guiding the flap so as to, upon translationally moving a carriage supporting the flap along a linear bearing rail, extend or retract the flap.

SUMMARY OF THE INVENTION

The invention is directed at an object of providing a flap actuating system for use in an aircraft that has a compact and light-weight design improving the cost-efficiency and reliability of an airfoil flap system.

A flap actuating system for use in an aircraft is provided for supporting and actuating an aircraft flap. The supported and actuated flap preferably forms a part of an aerodynamic component of the aircraft, such as an airfoil, a wing, an aileron, a rudder, an elevator or the like. Further, the flap is preferably configured and design to, upon being actuated by the flap actuating system, move between an extended and retracted position. Specifically, for supporting and guiding the flap, the flap actuating system comprises a carriage which is engageable with and translationally movable along at least one linear bearing rail. The linear bearing rail is preferably fixedly connected to an aircraft structure, i.e., a main body of the aerodynamic component. For engaging the carriage with the linear bearing rail, the carriage may comprise at least one linear bearing element engageable with the linear bearing rail. Thus, the linear bearing rail, together with the bearing element, forms a linear bearing of the flap actuating system. The linear bearing is preferably designed to provide free motion of the carriage along only one axis. In this configuration, the carriage is preferably configured to, upon being translationally moved along the linear slide rail of the linear slide bearing, actuate the flap so as to move the flap between its extended and retracted position. The flap is preferably rotationally connected to the carriage. Specifically, for connecting the flap to the carriage, the carriage may have a flap support with a rotary joint for rotationally coupling the flap, i.e., a connecting element of the flap, to the carriage.

For actuating the flap, the flap actuating system further comprises a linear actuator having a linearly actuatable coupling element coupled to the carriage. The linear actuator further has a drive element configured to linearly actuate the coupling element in a direction substantially parallel to a movement direction of the carriage along the linear bearing rail. In this context, the term "linearly actuatable coupling element" means that a coupling element is provided that, upon being actuated by the drive element of the linear actuator, is linearly translated, preferably, with respect to the linear bearing rail. In other words, for translationally moving the carriage, the coupling element is not subjected to a swivel movement about an axis perpendicular to the movement direction of the carriage along the linear bearing slide.

Specifically, the flap actuating system is designed and configured such that the drive element is arranged substantially parallel to the movement direction of the carriage along the linear bearing rail. In other words, in an installed state of the flap actuating system, the drive element is arranged substantially parallel to the linear bearing rail. Further, the flap actuating system is preferably provided such that the drive element remains in a parallel position relative to the movement direction of the carriage when the carriage is moved along the linear bearing rail between a first position, in which the flap is positioned in its extended position, and a second position, in which the flap is positioned in its retracted position.

By providing a configuration of the flap actuating system, in which the drive element of the linear actuator is arranged and remains in parallel to the movement direction of the carriage and, in the installed state of the flap actuating system, also in parallel to the linear bearing rail, a compact design of the flap actuating system can be ensured. Specifically, compared to known flap actuating systems, the drive element can be arranged close to the carriage and a fairing or free space for enabling swivel movements of the drive element relative to the carriage and the linear bearing rail can be dispensed with. Further, as swivel movements of the drive element are not required in this configuration, the number of movable parts and thus the number of parts subjected to wear can be reduced. As a result, a less complex and light-weight design of the carriage can be ensured that is also cost-efficient with respect to its manufacturing as well as its maintenance.

In a further development, the linear actuator may comprise a coupling element in the form of a screw nut and a drive element in the form of a threaded shaft connected to the screw nut. The linear actuator may be configured to translate rotational motion of the threaded shaft to linear motion of the carriage along the linear bearing rail. Specifically, the coupling element in the form of the screw nut and the drive element in the form of the threaded shaft may form a ball screw drive. In such a configuration, the screw nut is a ball nut and the threaded shaft is a ball screw which may be packaged in an assembly with recirculating ball bearings which roll in matching ball forms provided between the ball nut and the ball screw. The forces transmitted are preferably distributed over a large number of ball bearings, giving a low relative load per ball and a very low friction coefficient. Alternatively, the coupling element in the form of the screw nut and the drive element in the form of the threaded shaft may form a worm gear.

Further, for linearly actuating the coupling member, the linear actuator may comprise a drive unit configured to rotationally drive the threaded shaft. The threaded shaft may be rotationally supported in the main body of the aerodynamic component of the aircraft by means of appropriate rolling bearings. For example, the linear actuator may comprise two spherical roller bearings rotationally connecting the threaded shaft at its end sections to the aircraft structure, i.e., to the main body of the aerodynamic component. The spherical roller bearings are preferably configured to allow a rotary movement of the threaded shaft around its longitudinal axis relative to the aircraft structure, wherein a relative translational movement between the threaded shaft and the aircraft structure is locked.

In a further development, the carriage may be designed to at least partially receive the coupling element of the linear actuator. For example, the carriage may comprise an actuator support having a U-shaped cross-section with two spaced, separate actuator support arms which are configured to connect the coupling element to the carriage. In such a configuration, the carriage may be designed and configured to at least partially receive the coupling element within a space between the two spaced, separate support arms. By partially receiving the coupling element, this configuration of the carriage ensures a particularly compact design of the flap actuating system, in which the linear actuator can be arranged within the carriage and particularly close to the linear bearing rail.

In the following, a coupling between the carriage and the coupling member of the linear actuator is disclosed in more detail.

The coupling between the carriage and the coupling element may be provided by virtue of a form-fitting connection between the carriage and the coupling element. Specifically, the carriage may comprise at least one first locking member detachably connected to at least one complementary formed second locking member of the coupling element. The first and the second locking members may be designed and configured to, in a state in which the first locking member is engaged with the second locking member, provide a form-fitting connection between the carriage and the coupling element along the movement direction of the carriage. In other words, by means of the first and the second locking member, a relative movement between the carriage and the coupling element in a movement direction of the carriage along the linear bearing rail is locked by a form closure. Thus, when the coupling element is linearly actuated in the movement direction of the carriage along the linear bearing rail, the coupling element is pushed toward or against the carriage, thereby causing a translational movement of the carriage along the linear bearing rail. Specifically, the first and the second locking members may be designed and configured to, in the engaged state thereof, provide a form-fitting connection between the carriage and the coupling element in direction of both a first movement direction of the carriage along the linear bearing rail and a second movement direction of the carriage along the linear bearing rail opposed to the first movement direction. By providing a form-fitting connection between the carriage and the coupling element, a quick and easy assembly of the flap actuating system can be ensured.

Further, the first and the second locking members are designed and configured to, in the state in which the first locking member is engaged with the second locking member, provide a form-fitting connection between the carriage and the coupling element in a first movement direction of the coupling element relative to the carriage perpendicular to the movement direction of the carriage, and to release a movement of the coupling element relative to the carriage in a second movement direction of the coupling element opposed to the first movement direction. Accordingly, the first and the second locking members may be engaged with or released from one another by moving the first and the second locking members relative to one another in a direction perpendicular to the movement direction of the carriage along the linear bearing rail. This configuration further contributes to a quick and easy assembly of the flap actuating system.

During operation of the flap actuating system, the carriage and the linear actuator may be subjected to excessive loads causing deformation and deflection of the flap actuating system, i.e., misalignment of the carriage and the linear actuator. As a result, unwanted forces acting between the coupling element and the carriage may be generated, which unnecessarily burdens the flap actuating system. For example, unwanted forces of such type may induce high frictional forces when actuating the coupling element. Therefore, the connection between the carriage and the coupling element may be provided with a clearance. In this way, a relative movement, e.g., a relative rotational movement, between the carriage and the linear actuator is released or allowed to a certain extent, so as to prevent the coupling element and the carriage form being subjected to unwanted forces. Accordingly, the first and the second locking members may be designed such that, in the state in which the first locking member is engaged with the second locking member, the form-fitting connection has a clearance along the movement direction of the carriage. In other words, in the engaged state of the first and the second locking member, a relative movement between the carriage and the coupling element along the movement direction of the carriage is released to a certain extent. In this way, complex, rotatably supported couplings, such as a gimbal, for providing a coupling between the carriage and the coupling element capable of compensating a misalignment between the components avoiding unwanted forces therebetween can be dispensed with.

In the further development, the first locking member of the carriage may have a first locking surface oriented in the first movement direction of the carriage and a second locking surface oriented in the second movement direction of the carriage which is opposed to the first movement direction. In this context, the term "oriented" with regard to a surface refers to a direction of a surface normal thereof. Further, the second locking member of the coupling element may have a third locking surface oriented in the second movement direction and a fourth locking surface oriented in the first movement direction. The first and the second locking members may be designed such that, in the state in which the first locking member is engaged with the second locking member, the first locking surface is engageable with the third locking surface so as to lock a movement of the coupling element relative to the carriage in the second movement direction. In other words, in the engaged state of the first and the second locking member, the first and the third locking surface can abut on one another so as to lock a relative movement between the carriage and the coupling element in the second movement direction. Further, the first and the second locking members may be designed such that, in the state in which the first locking member is engaged with the second locking member, the second locking surface is engageable with the fourth locking surface so as to lock a movement of the coupling element relative to the carriage in the first movement direction.

In a first configuration, the first and the second locking members may be designed such that, in the engaged state thereof, the second locking member, in a movement direction of the carriage along the linear bearing rail, is arranged between the first and the second locking surfaces of the first locking element. More specifically, the first and the second locking members may be designed such that the first and the second locking surfaces of the first locking member are facing each other. Further, in order to provide a connection between the carriage and the coupling element having a clearance along the movement direction of the carriage, a first distance between the first and the second locking surfaces of the first locking member in the movement direction of the carriage may be greater than a second distance between the third and the fourth locking surfaces of the second locking member in the movement direction of the carriage. In this way, a relative movement between the first and the second locking members in the movement direction of the carriage is released to a certain extent.

In an alternative configuration, the first and the second locking members may be designed such that, in the engaged state thereof, the first locking member, in the movement direction of the carriage along the linear bearing rail, is arranged between the third and the fourth locking surfaces of the second locking member. More specifically, the first and the second locking members may be designed such that the third and the fourth locking surfaces of the second locking member are facing each other. Further, the first distance between the first and the second surfaces of the first locking member in the movement direction of the carriage may be smaller than the second distance between the third and the fourth locking surfaces of the second locking member in the movement direction of the carriage so as to provide a connection between the carriage and the coupling element having a clearance along the movement direction of the carriage.

In a further development, the first locking member of the carriage may have a fifth locking surface oriented perpendicular to the first and the second locking surfaces. Accordingly, the second locking member of the coupling element may have a sixth locking surface oriented perpendicular to the third and fourth locking surfaces. The first and the second locking members may be designed such that, in the state in which the first locking member is engaged with the second locking member, the fifth locking surface is engageable with the sixth locking surface so as to lock a relative movement of the coupling element relative to the carriage in the first direction perpendicular to the movement direction of the carriage.

Further, the first locking member may be provided in the form of locking jaws having the first and the second locking surfaces. In the locking jaws, the first and the second locking surfaces may face each other. The second locking member may be provided in the form of a protrusion arranged on an outer surface of the coupling element. The protrusion may have a first front surface forming the third locking surface and a second front surface arranged on an opposed side with respect to the first front surface and forming the fourth locking surface. Accordingly, the flap actuating system may be designed such that, in the engaged state of the first and the second locking members, the protrusion arranged on the coupling element may be disposed within the locking jaws of the carriage.

In a further development, the coupling element may comprise two second locking members arranged on unopposed sides thereof. Accordingly, the carriage may comprise two first locking members engaged to the two second locking members, respectively. More specifically, each of the two second locking members may be arranged on a distal end of one of the two actuator support arms, respectively.

Alternatively to the first and the second locking members, the carriage may be connected to the coupling element by means of a pivoted actuator support, in particular a gimbal. Specifically, the carriage may comprise the pivoted actuator support, in particular the gimbal, which may be connected to the coupling element and configured to allow a relative rotational movement between the carriage and the coupling element. By providing the pivoted actuator support, only translational forces are transmitted between the coupling element and the carriage, wherein, as the pivoted actuator support provides free rotational movement, torques are not transmitted between the coupling element and the carriage. This configuration has the effect that, as a rotary degree of freedom is provided between the carriage and the coupling element, the coupling element and the carriage are prevented from being subjected to unwanted forces induced by virtue of excessive loads acting on the flap actuating system and causing misalignment of its components.

In a further development, the carriage may comprise at least one bearing element engaged with the linear bearing rail. For example, the carriage may comprise two bearing elements arranged on opposed sides of the carriage which are engageable to two complementary formed linear bearing rails, respectively.

The at least one bearing element may be provided in the form of a slide element forming a linear slide bearing. Thus, a carriage may be provided that is configured to be supported and guided along a linear slide bearing. Compared to known flap arrangements having a rolling-element bearing, such as ball bearings or roller bearings, for supporting and guiding a carriage of a flap, the use of a slide bearing has the effect that rolling elements can be omitted. Accordingly, the number of movable parts and thus the number of parts subjected to wear can be reduced. Further, rolling-element bearings may cause point loads between the rolling elements and a guiding rail or track. Upon moving the carriage, this can cause alternating and dynamic loads on local contact points inducing a risk of damaging to rail and roller. By providing a slide bearing, a contact surface between the slide elements and the slide rails is enlarged compared to rolling-element bearings, thereby providing a load-optimized design avoiding local contact points. Still further, the sliding couples of the slide bearing formed by the slide elements and the slide rails are preferably self-lubricating. As a result, a less complex and light-weight design of the carriage can be ensured that is also cost-efficient with respect to its manufacturing as well as its maintenance. With reducing the number of parts subjected to wear, also the reliability of a flap actuating system equipped with a carriage of such type can be improved. Alternatively or additionally, the at least one bearing element may be provided in the form of a roller element forming a linear rolling-element bearing.

The slide element forming the slide bearing may be formed by surfaces of opposing edge regions of the carriage. Alternatively or in addition, the carriage may comprise at least two slide elements provided in the form of slide bearing attachments detachably connected to the opposing edge regions of the carriage. Specifically, the attachments may have an outer contour adapted to a shape of the linear bearing rail and an inner contour adapted to a contour of the edge regions of the carriage. Further, to ensure an even force transmission between the carriage and the attachments, the edge regions of the carriage engaging with the attachments may be at least partially rounded. In this way, the carriage can be prevented from being subjected to local point loads. By providing the attachments forming the slide elements, components of the slide bearing subjected to wear can be easily adapted and replaced, thereby providing an improved configurability and maintenance of the carriage.

BRIEF DESCRIPTION OF THE DRAWINGS

Preferred embodiments of the invention are explained in greater detail below with reference to the accompanying schematic drawings, in which.

DETAILED DESCRIPTION OF THE PREFERRED EMBODIMENTS

FIGS. 1 to 4 show a flap actuating system 10 for use in an aircraft according to a first embodiment for supporting and actuating a flap of the aircraft, which is not depicted in the figures. The supported and actuated flap preferably forms a part of an airfoil of the aircraft. Further, the flap is configured and design to, upon being actuated by the flap actuating system, move between an extended and retracted position.

Figure 2:
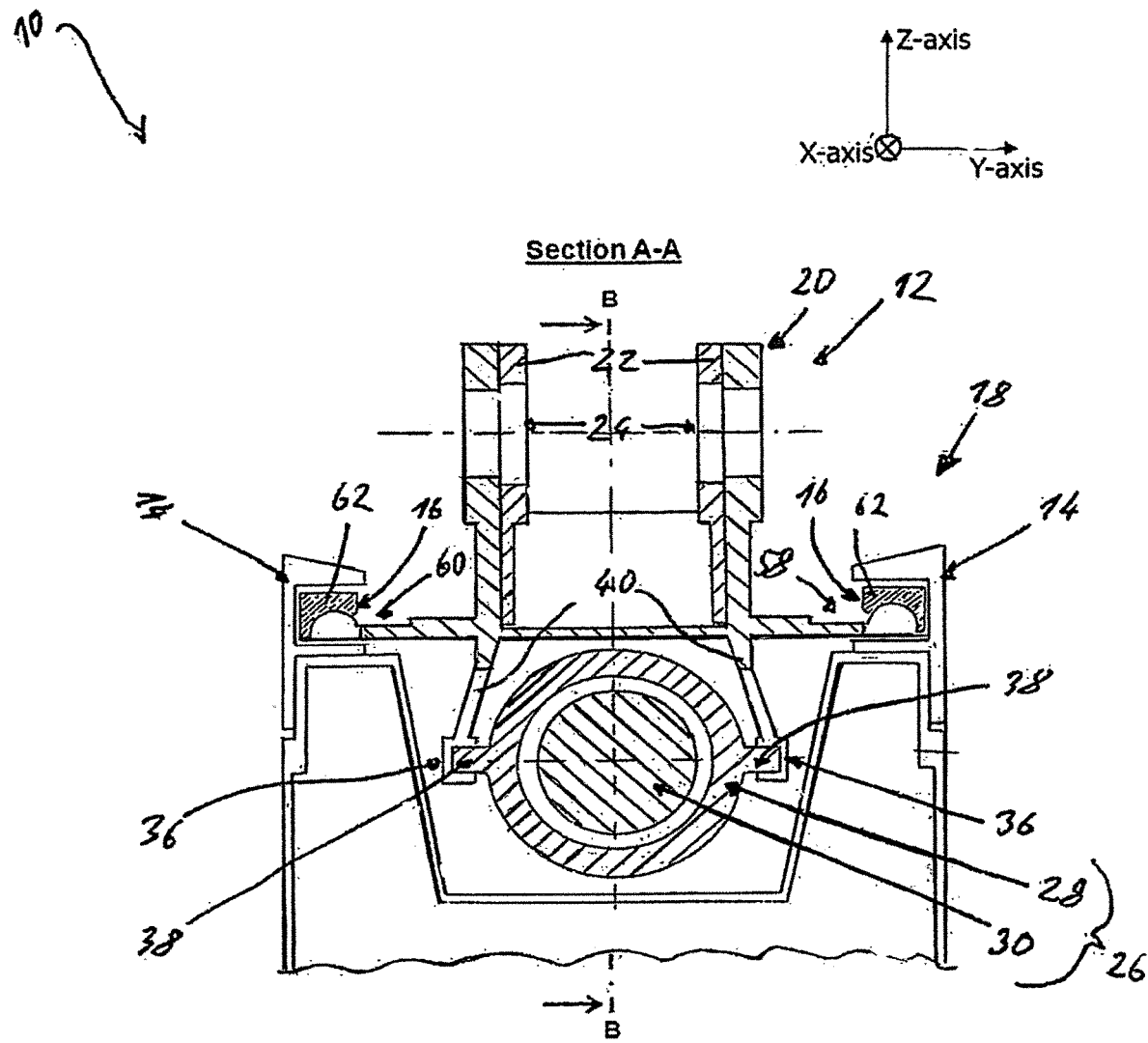
FIG. 2 shows a cross section view of the flap actuating system along section A-A indicated in FIG. 1.

For supporting and guiding the flap, the flap actuating system 10 comprises a carriage 12 which is engageable with and translationally movable along two linear bearing rails 14, as depicted in FIG. 2. The linear bearing rails 14 are fixedly connected to a main body of the airfoil. For engaging the carriage 12 with the linear bearing rails 14, the carriage 12 comprises two linear bearing elements 16, each of which is engaged with one of the linear bearing rails 14, respectively. The linear bearing rails 14, together with the bearing elements 16, form a linear bearing 18 of the flap actuating system. The linear bearing 18 is designed and configured to provide free motion of the carriage 12 along only one axis, i.e., an X-axis that is parallel to a longitudinal axis of the linear bearing rails 14.

The carriage 12 is configured to, upon being translationally moved along the linear slide rails 14 of the linear slide bearing 18, actuate the flap so as to move the flap between its extended and retracted position. For connecting the flap to the carriage 12, the carriage 12 comprises a flap support 20 which is rotatably connected to the flap. Specifically, the flap support 20 has a rotatory joint, which is not depicted in the figures, connectable to a connecting element of the flap. The rotatory joint has a rotation axis parallel to a Y-axis which is perpendicular to a movement direction of the carriage 12 along the linear bearing rails 14, i.e., along the X-axis. The flap support 20 has a U-shaped cross section having two spaced connecting arms 22 for receiving the rotary joint and the connecting element of the flap connected to the rotary joint. Specifically, for receiving the rotary joint, the flap support 20 comprises a through-hole 24 extending through the connecting arms 22 in parallel to the rotation axis of the rotary joint, i.e., the Y-axis.

Figure 1:
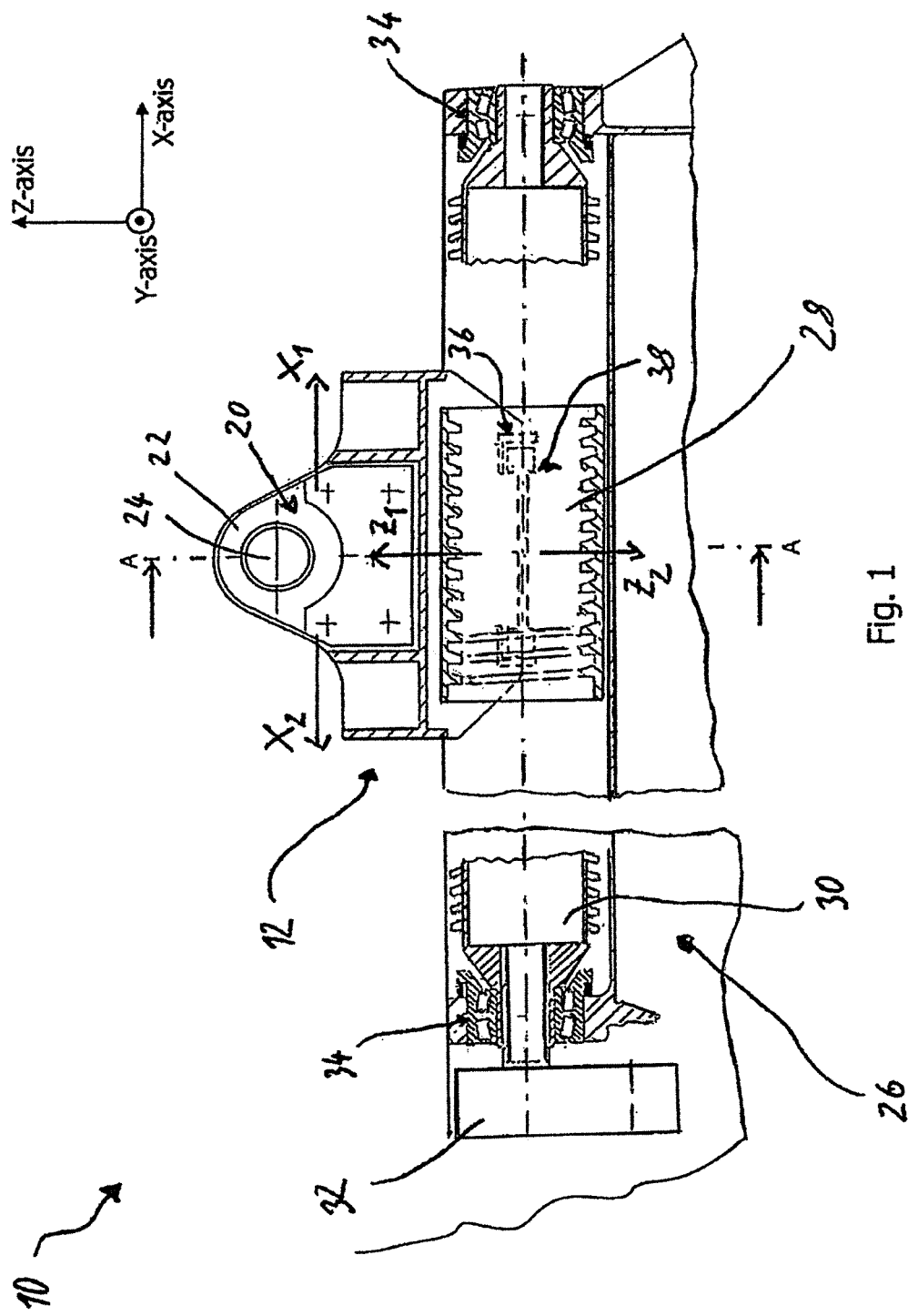
FIG. 1 shows a longitudinal section view of a flap actuating system for use in an aircraft according to a first embodiment.

As depicted in FIG. 1, for actuating the flap, the flap actuating system 10 comprises a linear actuator 26 having a linearly actuatable coupling element 28 coupled to the carriage 12. The linear actuator 26 further has a drive element 30 connected to the coupling element 28 and configured to linearly actuate the coupling element 28 in a direction parallel to the movement direction of the carriage along the linear bearing rails 14, i.e., the X-axis.

The flap actuating system 10 is designed and configured such that the drive element 30 of the linear actuator 26 remains in a parallel position relative to the movement direction of the carriage 12, i.e., along the X-axis, when the carriage 12 is actuated by the linear actuator 26. In other words, when the carriage 12 is moved along the linear bearing rails 14 between a first position, in which the flap is positioned in its extended position, and a second position, in which the flap is positioned in its retracted position, the drive element 30 of the linear actuator 26 remains in its parallel position relative to the movement direction of the carriage 12.

Specifically, the coupling element 28 is provided in the form of a screw nut and the drive element 30 is provided in the form of a threaded shaft connected to the screw nut 28. The linear actuator 26 is configured to translate rotational motion of the threaded shaft 30 to linear motion of the carriage 12 along the linear bearing rails 14. Accordingly, the linear actuator 26 comprises a drive unit 32 configured to rotationally drive the drive element 30 in the form of the threaded shaft. Preferably, the coupling element 28 in the form of the screw nut and the drive element 30 in the form of the threaded shaft form a ball screw drive.

The drive element 30 in the form of the threaded shaft is rotationally supported in the main body of the airfoil by means of two spherical roller bearings 34. The spherical roller bearings 34 are connected to the drive element 30 in the form of the threaded shaft at end sections thereof and are configured to allow a rotary movement of the threaded shaft 30 around its longitudinal axis, that is, parallel to the X-axis, wherein a relative translational movement between the threaded shaft 30 and the airfoil main body is locked.

Figure 3:
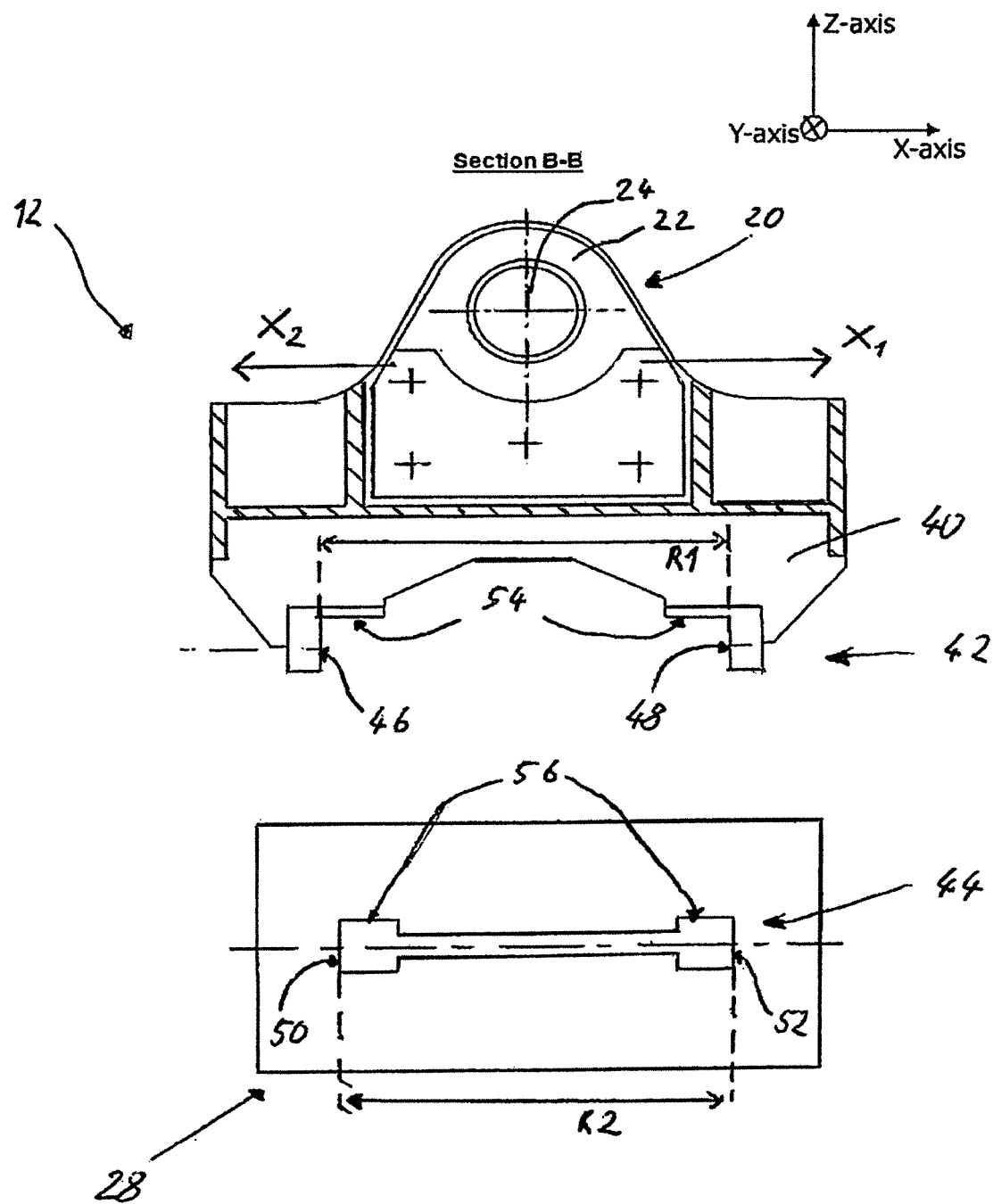
FIG. 3 shows a longitudinal section assembly drawing of a carriage and a coupling element of the flap actuating system along section B-B indicated in FIG. 2.
Figure 4:
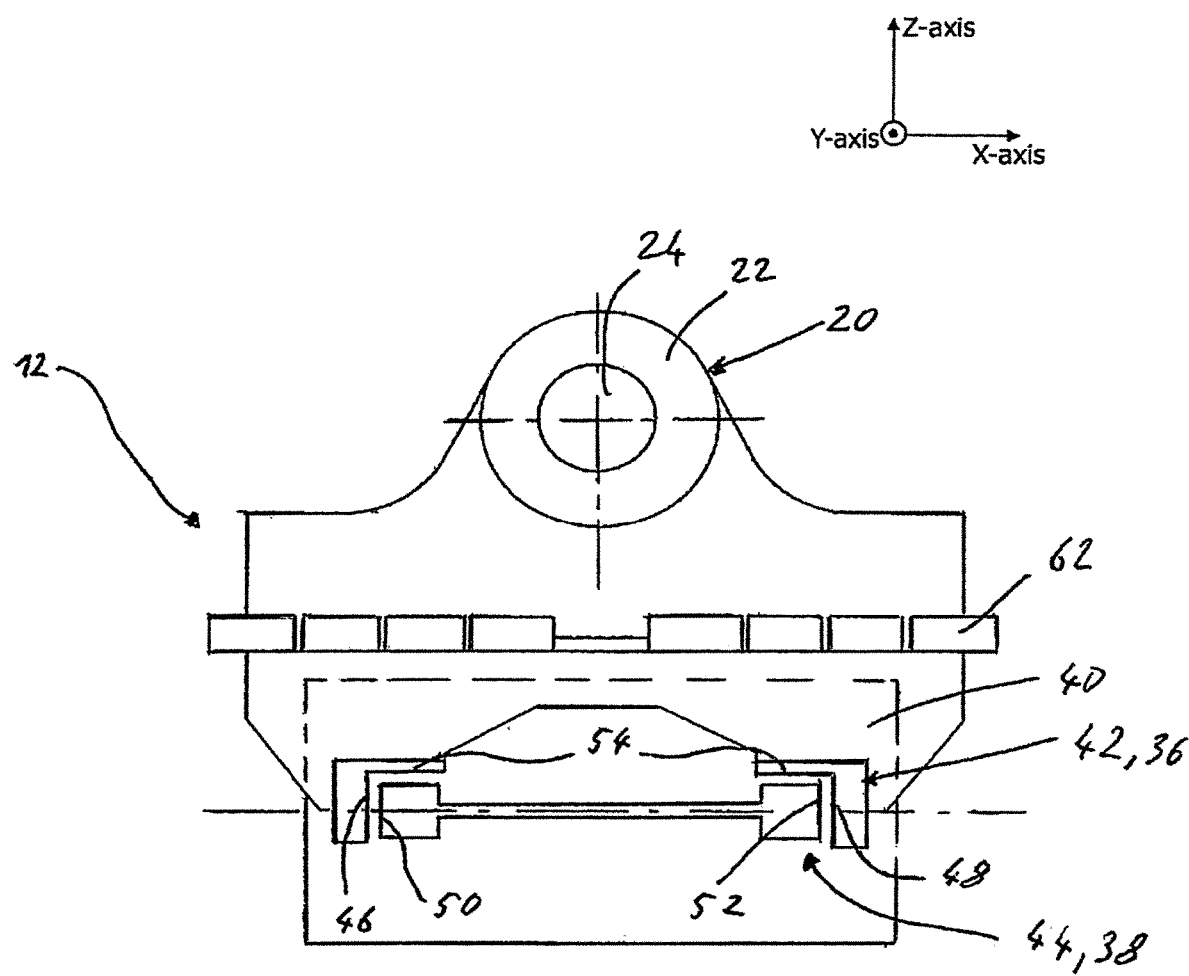
FIG. 4 shows a side view of the carriage engaged with the coupling element of the flap actuating system shown in FIGS. 1 to 3.

For coupling the carriage 12 to the coupling element 28, the carriage 12 comprises two first locking members 36, each of which is detachably connected to one complementary formed second locking member 38 of the coupling element 28, respectively, as depicted in FIGS. 2 to 4. The first and the second locking members 36, 38 are designed and configured to, in a state in which the first locking members 36 are engaged with the second locking members 38, provide a form-fitting connection between the carriage 12 and the coupling element 28 along the movement direction of the carriage 12, i.e., along the X-axis. In other words, by means of the first and the second locking members 36, 38, a relative movement between the carriage 12 and the coupling element 28 along the movement direction of the carriage 12 is locked by a form closure. Thus, when the coupling element 28 is linearly actuated in movement direction of the carriage 12 along the linear bearing rails 14, the second locking members 38 of the coupling element 28 are pushed toward or against the first locking members 36 of the carriage 12, thereby causing a translational movement of the carriage 12 along the linear bearing rails 14. Specifically, the first and the second locking members 36, 38 may be designed and configured to, in the engaged state thereof, provide a form-fitting connection between the carriage 12 and the coupling element 28 in direction of both a first movement direction X1 and a second movement direction X2 of the carriage 12 opposed to the first movement direction X1, as indicated by arrows in FIG. 1.

Further, the first and the second locking members 36, 38 are designed and configured to, in the engaged state thereof, provide a form-fitting connection between the carriage 12 and the coupling element 28 in a first movement direction Z1 of the coupling element 28 relative to the carriage 12. The first movement direction Z1 of the coupling element 28 relative to the carriage 12 is perpendicular to the movement direction of the carriage 12. To that end, the first and the second locking members 36, 38 are designed and configured to, in the engaged state thereof, release a relative movement between the carriage 12 and the coupling element 28 in a second movement direction Z2 of the of the coupling element 28 relative to the carriage 12 opposed to the first direction Z1.

In the arrangement shown in FIGS. 1 to 4, the first locking members 36 are provided in the form of locking jaws 42, disposed on end portions of two spaced and separated actuator support arms 40 forming an actuator support. Specifically, the actuator support arms 40 of the carriage 12 are designed and configured to partially receive the coupling element 28 within a space between the actuator support arms 40.

In FIG. 3, the carriage 12 and the coupling element 28 are depicted in a decoupled state. The second locking members 38 are provided in the form of protrusions 44 arranged on opposed sides of an outer surface of the coupling element 28. Specifically, the flap actuating system is designed such that, in the engaged state of the first and the second locking members 36, 38, each of the protrusions 44 of the coupling element 28 is disposed within one of the two the locking jaws 42 of the carriage 12.

More specifically, the first locking members 36 in the form of the locking jaws 42 have a first locking surface 46 oriented in the first movement direction X1 of the carriage 12 and a second locking surface 48 oriented in the second movement direction X2 of the carriage 12. In each of the locking jaws 42, the first and the second locking surface 46, 48 face each other. Accordingly, the second locking member 38 in the form of the protrusions 44 have a third locking surface 50 oriented in the second movement direction X2 and a fourth locking surface 52 oriented in first movement direction X1. The protrusions 44 have a first front surface forming the third locking surface 50 and a second front surface arranged on an opposed side with respect to the first front surface and forming the fourth locking surface 52. The first and the second locking members 36, 38 are designed such that, in their engaged state, the first locking surface 46 is engageable with the third locking surface 50 so as to lock a movement of the coupling element 28 relative to the carriage 12 in the second movement direction X2 and the second locking surface 48 is engageable with the fourth locking surface 52 so as to lock a movement of the coupling element 28 relative to the carriage 12 in the first movement direction X1.

For avoiding the occurrence of unwanted forces induced by a misalignment between the carriage 12 and the linear actuator 26, the connection between the carriage 12 and the coupling element 28 is provided with a clearance. In this way, a relative movement, e.g., a relative rotational movement, between the carriage 12 and the linear actuator 26 is released or allowed to a certain extent. Specifically, the first and the second locking members 36, 38 are designed such that, in the engaged state thereof, the form-fitting connection has a clearance along the movement direction of the carriage 12. In other words, in the engaged state of the first and the second locking members 36, 38, a relative movement between the carriage 12 and the coupling element 28 along the movement direction of the carriage 12 is released to a certain extent.

This is achieved by designing the first and the second locking members 36, 38 such that, as shown in FIG. 3, a first distance R1 between the first and the second locking surfaces 46, 48 of the first locking members 36 in the movement direction of the carriage 12 is greater than a second distance R2 between the third and the fourth locking surfaces 50, 52 of the second locking members 38 in the movement direction of the carriage 12. In this way, in the engaged state of the first and the second locking members 36, 38, a relative movement between the first and the second locking members 36, 38 in movement direction of the carriage 12 is released to a certain extent.

In an alternative configuration, the first and the second locking members may be designed such that, in their engaged state, the first locking member, in movement direction of the carriage along the linear bearing rails, is arranged between the third and the fourth locking surface of the second locking member. Accordingly, in order to provide a clearance along the movement direction of the carriage in this configuration, the first distance between the first and the second surface of the first locking member in the movement direction of the carriage may be smaller than the second distance between the third and the fourth locking surface of the second locking member in the movement direction of the carriage.

Further, the first locking members 36 of the carriage 12 have a fifth locking surface 54 oriented perpendicular to the first and the second locking surfaces 46, 48. Accordingly, the second locking members 38 of the coupling element 28 have a sixth locking surface 56 oriented perpendicular to the third and fourth locking surfaces 50, 52. The first and the second locking members 36, 38 are designed such that, in their engaged state, the fifth locking surface 54 is engageable with the sixth locking surface 56 so as to lock a movement of the coupling element 28 relative to the carriage 12 in the first direction Z1 perpendicular to the movement direction of the carriage 12.

Further, as regards the linear bearing 18 for supporting the carriage 12 along the linear bearing rails 14, the linear bearing elements 16 of the carriage are provided in the form of two slide elements arranged at opposed edge regions 58, 60 of the carriage 12. By this configuration, the linear bearing rails 14 and the linear slide elements 16 form a linear slide bearing. The slide elements 16 are provided in the form of slide bearing attachments 62 detachably connected to the opposing edge regions 58, 60 of the carriage 12. Specifically, the attachments 62 have an outer contour adapted to a shape of the linear bearing rails 14 and an inner contour adapted to a contour of the edge regions 58, 60 of the carriage 12. Further, to ensure an even force transmission between the carriage 12 and the attachments 62, the edge regions 58, 60 of the carriage 12 engaging with the attachments 62 are partially rounded.

Figure 5:
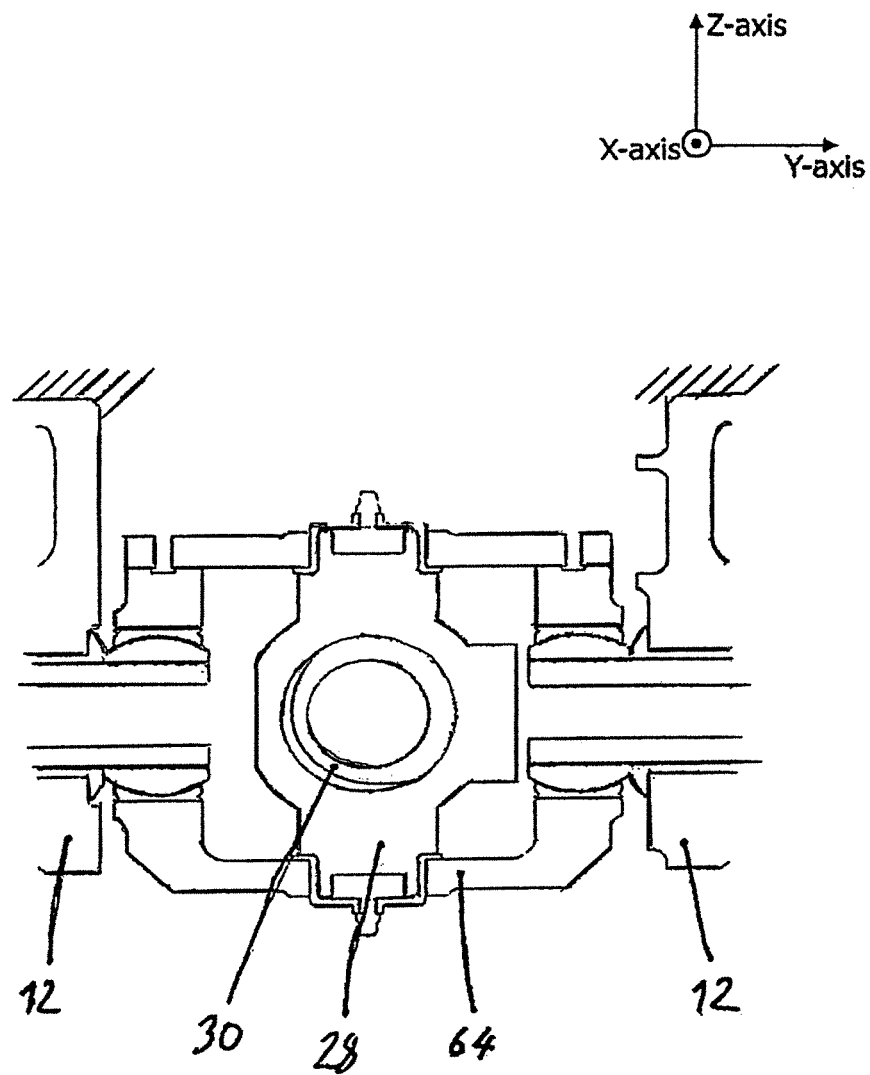
FIG. 5 shows a front view of a flap actuating system for use in an aircraft according to a second embodiment.

FIG. 5 shows a flap actuating system 10 according to a second embodiment. Compared to the arrangement shown in FIGS. 1 to 4, the carriage 12 of the flap actuating system 10 according to the second embodiment comprises a pivoted actuator support in the form of a gimbal 64 for connecting the coupling element 28 to the carriage 12. In other words, the first and the second locking members 36, 38 of the flap actuating system 10 shown in FIGS. 1 to 4 are substituted by the gimbal 64. By providing the gimbal 64 as a connecting means between the carriage 12 and the coupling element 28, only translational forces are transmitted therebetween, wherein, as the gimbal 64 provides free rotational movement, torques are not transmitted. In this way, the connection between the carriage 12 and the coupling element 28 can be prevented from being subjected to unwanted forces.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flap actuating system for use in an aircraft, comprising:
    a carriage for supporting and guiding a flap which is engageable with and translationally movable along at least one linear bearing rail,
    a linear actuator having a linearly actuatable coupling element coupled to the carriage and a drive element configured to linearly actuate the coupling element in a direction substantially parallel to a movement direction of the carriage along the linear bearing rail, wherein the drive element is arranged substantially parallel to the movement direction of the carriage along the linear bearing rail;
    wherein the carriage comprises at least one first locking member detachably connected to at least one complementary formed second locking member of the coupling element, and wherein the first and the second locking members are designed and configured to, in a state in which the first locking member is engaged with the second locking member, provide a form-fitting connection between the carriage and the coupling element along the movement direction of the carriage; and
    wherein the first locking member is provided in a form of locking jaws having a first locking surface and a second locking surface facing each other.

2. The flap actuating system according to claim 1, wherein the coupling element is a screw nut and the drive element is a threaded shaft connected to the screw nut, and wherein the linear actuator is configured to translate rotational motion of the threaded shaft to linear motion of the carriage along the linear bearing rail.

3. The flap actuating system according to claim 2, wherein the linear actuator comprises a drive unit configured to rotationally drive the threaded shaft.

4. The flap actuating system according to claim 1, wherein the carriage is configured to at least partially receive the coupling element of the linear actuator.

5. The flap actuating system according to claim 1, wherein the first and the second locking members are designed and configured to, in the state in which the first locking member is engaged with the second locking member, provide a form-fitting connection between the carriage and the coupling element in a first movement direction of the coupling element relative to the carriage perpendicular to the movement direction of the carriage, and to release a movement of the coupling element relative to the carriage in a second movement direction opposed to the first movement direction.

6. The flap actuating system according to claim 1, wherein the first and the second locking members are designed such that, in the state in which the first locking member is engaged with the second locking member, the form-fitting connection has a clearance along the movement direction of the carriage.

7. The flap actuating system according to claim 1, wherein the first locking member of the carriage has the first locking surface oriented in a first movement direction of the carriage and the second locking surface oriented in a second movement direction of the carriage opposed to the first movement direction, wherein
    the second locking member of the coupling element has a third locking surface oriented in the second movement direction and a fourth locking surface oriented in the first movement direction, and wherein
    the first and the second locking members are configured such that, in the state in which the first locking member is engaged with the second locking member, the first locking surface is engageable with the third locking surface so as to lock a movement of the coupling element relative to the carriage in the second movement direction and the second locking surface is engageable with the fourth locking surface so as to lock a movement of the coupling element relative to the carriage in the first movement direction.

8. The flap actuating system according to claim 7, wherein the first and the second locking members are configured such that the first and the second locking surface of the first locking member are facing each other and a first distance between the first and the second locking surface of the first locking member in the movement direction of the carriage is greater than a second distance between the third and the fourth locking surface of the second locking member in the movement direction of the carriage so as to provide a clearance along the movement direction of the carriage.

9. The flap actuating system according to claim 7 wherein the first and the second locking members are configured such that the third and the fourth locking surface of the second locking member are facing each other and a first distance between the first and the second surface of the first locking member in the movement direction of the carriage is smaller than a second distance between the third and the fourth locking surface of the second locking member in the movement direction of the carriage so as to provide a clearance along the movement direction of the carriage.

10. The flap actuating system according claim 7, wherein the first locking member of the carriage has a fifth locking surface oriented perpendicular to the first and the second locking surface, wherein
    the second locking member of the coupling element has a sixth locking surface oriented perpendicular to the third and fourth locking surface, and wherein
    the first and the second locking members are designed such that, in the state in which the first locking member is engaged with the second locking member, the fifth locking surface is engageable with the sixth locking surface so as to lock a movement of the coupling element relative to the carriage in the first movement direction of the coupling element perpendicular to the movement direction of the carriage.

11. The flap actuating system according claim 8, wherein the first locking member of the carriage has a fifth locking surface oriented perpendicular to the first and the second locking surface, wherein the second locking member of the coupling element has a sixth locking surface oriented perpendicular to the third and fourth locking surface, and wherein the first and the second locking members are designed such that, in the state in which the first locking member is engaged with the second locking member, the fifth locking surface is engageable with the sixth locking surface so as to lock a movement of the coupling element relative to the carriage in the first movement direction of the coupling element perpendicular to the movement direction of the carriage.

12. The flap actuating system according to claim 1, wherein the second locking member is provided in a form of a protrusion arranged on an outer surface of the coupling element.

13. The flap actuating system according to claim 1, wherein the carriage comprises a pivoted actuator support connected to the coupling element and configured to allow a relative rotational movement between the carriage and the coupling element.

14. The flap actuating system according to claim 13, wherein the pivoted actuator support comprises a gimbal.

15. The flap actuating system according to claim 1, wherein the carriage comprises at least one bearing element engaged with the linear bearing rail, and wherein the bearing element is provided in a form of a slide element forming a linear slide bearing.

16. The flap actuating system according to claim 1, wherein the carriage comprises at least one bearing element engaged with the linear bearing rail, and wherein the bearing element is provided in a form of a roller element forming a linear rolling-element bearing.

17. The flap actuating system according claim 15, wherein the carriage comprises at least two slide elements provided in a form of slide bearing attachments detachably connected to opposing edge regions of the carriage, wherein the attachments have an outer contour adapted to a shape of the linear bearing rail and an inner contour adapted to an contour of the edge regions of the carriage, and wherein the edge regions of the carriage connected to the attachments are at least partially rounded.

18. The flap actuating system according claim 16, wherein the carriage comprises at least two slide elements provided in a form of slide bearing attachments detachably connected to opposing edge regions of the carriage, wherein the attachments have an outer contour adapted to a shape of the linear bearing rail and an inner contour adapted to an contour of the edge regions of the carriage, and wherein the edge regions of the carriage connected to the attachments are at least partially rounded.

* * * * *